(12) United States Patent
Revelin et al.

(10) Patent No.: US 8,908,237 B2
(45) Date of Patent: Dec. 9, 2014

(54) EXTRACTION OF A DOCUMENT IN A SERIES OF RECORDED IMAGES

(75) Inventors: Stephane Revelin, Paris (FR); Julien Doublet, Paris (FR); Michael Verilhac, Paris (FR); Soufiane Jouini, Paris (FR); William Ketchantang, Paris (FR)

(73) Assignee: Morpho, Issy-les-Moulineaux (FR)

( * ) Notice: Subject to any disclaimer, the term of this patent is extended or adjusted under 35 U.S.C. 154(b) by 0 days.

(21) Appl. No.: 13/700,081

(22) PCT Filed: May 25, 2011

(86) PCT No.: PCT/FR2011/051189
§ 371 (c)(1),
(2), (4) Date: Nov. 26, 2012

(87) PCT Pub. No.: WO2011/148099
PCT Pub. Date: Dec. 1, 2011

(65) Prior Publication Data
US 2013/0070315 A1 Mar. 21, 2013

(30) Foreign Application Priority Data
May 27, 2010 (FR) ...................................... 10 54116

(51) Int. Cl.
| | |
|---|---|
| *H04N 1/04* | (2006.01) |
| *G06F 15/00* | (2006.01) |
| *G06K 15/00* | (2006.01) |
| *H04N 1/60* | (2006.01) |
| *H04N 1/192* | (2006.01) |
| *G06K 9/00* | (2006.01) |
| *G06T 7/20* | (2006.01) |
| *G06T 7/00* | (2006.01) |

(52) U.S. Cl.
CPC ...... *H04N 1/192* (2013.01); *G06T 2207/20148* (2013.01); *G06T 2207/20144* (2013.01); *G06K 2209/19* (2013.01); *G06T 2207/30176* (2013.01); *G06K 9/00* (2013.01); *G06T 7/2053* (2013.01); *G06T 2207/20036* (2013.01); *G06T 7/0091* (2013.01); *G06T 7/0081* (2013.01)

USPC .............. 358/474; 358/1.2; 358/2.1; 358/1.9; 399/301; 382/100

(58) Field of Classification Search
USPC ...................... 358/474, 1.2; 399/301; 382/100
See application file for complete search history.

(56) References Cited

U.S. PATENT DOCUMENTS

| | | | |
|---|---|---|---|
| 7,593,144 B2 | 9/2009 | Dymetman | |
| 7,720,253 B2* | 5/2010 | He et al. ......................... | 382/100 |
| 8,390,874 B2* | 3/2013 | Simske et al. .................. | 358/1.2 |
| 8,503,045 B2* | 8/2013 | Kubo et al. ..................... | 358/474 |
| 2002/0076242 A1* | 6/2002 | Arcaro et al. ................... | 399/301 |
| 2006/0082794 A1* | 4/2006 | Simske et al. .................. | 358/1.2 |
| 2010/0195129 A1 | 8/2010 | Iio et al. | |
| 2011/0299136 A1* | 12/2011 | Kubo et al. .................... | 358/474 |

OTHER PUBLICATIONS

Jing et al., "Foreground Motion Detection by Difference-Based Spatial Temporal Entropy Image," School of Computer Engineering Nanyang Technological University, Singapore 639798, 2004, vol. 1, p. 379-382.

(Continued)

*Primary Examiner* — Charlotte M Baker
*Assistant Examiner* — Rury Grisham
(74) *Attorney, Agent, or Firm* — Marshall, Gerstein & Borun LLP

(57) ABSTRACT

The invention relates to a document-processing system, which includes a device suitable for supplying consecutive recorded images as well as a background surface, comprising a step of storing a standard background surface image. The next step consists of detecting the presence of a document moving across a series of recorded images relative to the standard background surface image. The following step consists of monitoring the movement of the document within the series of images. The end of the movement of the document is then detected and the standard background surface image is updated. The movement of the document is monitored by determining document-extraction masks respectively for the recorded images, the extraction mask of a recorded image being obtained according to an entropy card of the recorded image relative to said standard background surface image.

19 Claims, 8 Drawing Sheets

(56) References Cited

OTHER PUBLICATIONS

Kim et al., "The Office of the Past: Document Discovery and Tracking from Video," Department of Computer Science and Engineering University of Washington, 2004.

Liang et al., "Camera-Based Analysis of Text and Documents: A Survey," International Journal on Document Analysis and Recognition, 2005, vol. 7, p. 84-104.

Search Report and Written Opinion for PCT/FR2011/051189, issued on Jul. 12, 2011.

* cited by examiner

EXTRACTION OF A DOCUMENT IN A SERIES OF RECORDED IMAGES

FIELD OF THE INVENTION

The present invention relates to document readers and more particularly to readers of documents such as game tickets.

BACKGROUND OF THE INVENTION

A game ticket reader generally corresponds to a unit having an input face into which the game ticket to be read is inserted. The ticket is slipped into the slot then driven using mechanical rollers to an optical reader suitable for extracting the information indicated on the game ticket in question.

Consequent maintenance costs can be associated with the use of such document readers. In fact, it is appropriate to regularly inspect and repair the mechanical rollers and the mechanical accessories associated with them.

The present invention aims to improve the situation.

SUMMARY OF THE INVENTION

A first aspect of the present invention proposes a document processing method in a system comprising on the one hand, a device suitable for supplying successive captured images, and on the other hand, a background surface;
said system storing a current background surface image;
said processing method comprising the following steps:
/a/ detecting the presence of a moving document in a series of captured images with respect to the current background surface image;
/b/ monitoring said movement of the document within said series of images;
/c/ detecting the end of the movement of said document; and
/d/ updating the current background surface image;
wherein, in step /b/, the movement of the document is monitored by determining document extraction masks respectively for the captured images, the extraction mask of a captured image being obtained on the basis of an entropy map of said captured image with respect to said current background surface image.

Such a processing method advantageously makes it possible to monitor a document automatically on the basis of a series of images captured when this document is placed on a surface of the processing system. Such document monitoring over the course of time is based on the extraction of this document from among different captured images taken into consideration and on the updating of the current background surface image after a document has been placed on or removed from this background surface.

Then, once the end of the movement has been detected, when the latter corresponds to document stacking, it is possible to extract an image of the document from one of the captured images and to supply this image of the document in order to carry out a reading of it by any possible type of document reading means.

Such processing is advantageously capable of being applied to any type of document, preferably not having uniformity and whose shape and content are not known a priori.

By the expression "current background surface image" is meant an image which represents the surface upon which a new document is placed. Provision is therefore made for updating this background surface image after the end of a movement is detected. It is appropriate to note henceforth that the movement of a document can correspond to document stacking or conversely to document unstacking. In the case where the end of a movement is detected, this is therefore either the addition of a new document on the current background surface or the removal of a document that has already been placed on the background surface. Thus, in the case of document stacking, just as in the case of document unstacking, provision is made for updating the current background surface image so that it represents the new background surface ready to possibly receive a new document.

This step of updating the current background surface image advantageously allows a pertinent monitoring of the movement of a document in a series of captured images. In fact, it is appropriate to note that this monitoring is astutely carried out by referring to this current background surface image. More precisely, provision is made for determining a document extraction mask for each captured image, this extraction mask being determined on the basis of an entropy map of the captured image in question with respect to the current background surface image. In this case it is a differential entropy map with reference to the current background surface image. On the basis of these differential entropy maps, it is possible to monitor the movement of the document within the series of captured images. It is therefore advantageously possible to make provision such that with each captured image of the series of images, or at least for a part of the captured images of the series of images, there is associated an extraction mask which corresponds in some way to the location of the moving document in the image with which it is associated. In this case the entropy represents a level of variation of information between the document and the background hidden by the document.

By the expression "extraction mask" of a captured image is meant a binary mask to be applied to the captured image so that it makes it possible to delimit the contours of the document whose presence has been detected and, because of this, it makes it possible to extract this document from this captured image.

It is understood that the expression "entropy map" of a captured image means a map which makes an entropy value correspond with all or a portion of the pixels of the captured image.

In an embodiment of the present invention, these steps as a whole make it possible to locate a document, over the course of time and in a pertinent manner, until reaching the end of its movement, and then to make use of an efficient extraction mask which finally, if necessary, makes it possible to extract the document whilst stopped in order to provide an image of it and to read it in a subsequent step. Such will be the case if the movement of the detected document is a document stacking.

Thanks to these characteristics, it is advantageously possible to track the movement of a document of which neither the shape nor the content are known a priori and which is placed on a background surface which can change over time. This context is particularly suitable for processing documents of the "game ticket" type. In fact, game tickets of different games are not of identical shape and do not contain information placed in identical locations for the different types of ticket.

In an application of a document processing method according to the present invention to the reading of game tickets, these characteristics make it possible to no longer have maintenance costs due to mechanical rollers, since in this document processing system it is possible for a user of the system, for example a clerk or even the player himself, to deposit a game ticket and for the latter to be extracted in order to be read, regardless of its shape, content and the manner in which it was placed on the surface of the system. Furthermore, it is advantageous to note that this method manages document stacking and unstacking. Thus, it is possible for any user to have several game tickets read one after another by placing these tickets one after another on the surface of the system provided for this purpose.

In an embodiment of the present invention, the document processing method comprises moreover the following steps:

determining a direction of movement of characteristic points of the extraction mask according to an axis over the series of captured images; and if the direction of movement corresponds to a document stacking, extracting an image of the document from a captured image.

Provision is made here for cleverly determining the direction of movement of the document, i.e. more precisely for determining if it is a document stacking or unstacking. Then, if the movement corresponds to document stacking, this means that a new document is to be read and in this case an image of the document extracted from a captured image is then provided in order that it may be read in a subsequent step.

In order to determine if the movement corresponds to stacking, an axis is taken into consideration and the movement of certain characteristic points of the extraction mask over the sequence of captured images is determined. By proceeding thus, it is possible to deduce easily and efficiently if this movement is document stacking. The processing system can for example correspond to a box with an opening allowing the manual insertion of documents in order to deposit them on the deposit surface of the system, also called the "background surface". In this case, the axis according to which the movement of characteristic points is determined corresponds to the axis perpendicular to the plane of opening of the system.

This axis generally corresponds to the direction of insertion and the direction of depositing a document on the deposit surface, or also background surface.

In an embodiment of the present invention, an entropy map is obtained for a given captured image in a movement search zone; said movement search zone being determined on the basis of the extraction mask determined for the preceding captured image.

By proceeding thus, it is possible to increase the speed of processing the document and because of this it is possible to improve performance since the entropy map is then determined only in a search zone, which makes it possible to locate the moving document, at least approximately. The computational load is therefore reduced by avoiding the performance of calculations outside the image zone where the movement occurs.

In an embodiment of the present invention, an extraction mask is determined for a given captured image according to the following steps:

/i/ obtaining an entropy map on the basis of a difference in grey levels between the current background surface image and the given captured image, said entropy map associating respective entropy values with the pixels of the image;

/ii/ normalizing the entropy values of said entropy map by obtaining standardized entropy values on a scale of 0-255; and /iii/ determining an extraction mask of the document from the captured image corresponding to the pixels of the captured image with which standardized entropy values higher than a threshold value are associated.

The determination of such an extraction mask makes it possible to in some way locate the document within the captured images and to monitor its movement over the course of time. It is thus possible to determine at each image the location of the document with respect to the background surface image which itself does not change as long as the document being monitored continues to move. In fact, the image of this background surface is updated only at the end of the movement of the document. Thus, firstly, first entropy values are calculated based on the difference in grey levels between the current background image and the given captured image taken into consideration.

It is moreover possible to provide for implementing the following steps on a captured image:

obtaining an entropy map of the captured image by difference between the captured image and the preceding captured image;

determining a first zone of said captured image corresponding to the zone that is common to the local entropy map of said captured image and the extraction mask of the preceding captured image;

determining a second zone corresponding to the entropy map of said captured image outside of the first zone; and wherein step /iii/ is carried out for the first zone and the second zone of the captured image, a first part of the extraction mask of the captured image corresponding to the pixels of the captured image of the first zone with which normalized entropy values higher than a first threshold value are associated and a second part of the extraction mask of the captured image corresponding to the pixels of the captured image of the second zone with which entropy values higher than a second threshold value are associated;

said first threshold value being higher than said second threshold value.

It can be noted that the superimposition of two documents generates a bigger variation of information than the superimposition of a document on the depositing plane, which is homogeneous. In the first case, the entropy will therefore be higher than in the second.

Such characteristics allow the use of different threshold values as a function of the overlapping of the successive extraction masks. Possible interferences can thus be avoided. Then the complete extraction mask is obtained by joining the first and second parts of extraction mask obtained.

In an embodiment of the present invention, provision is made to obtain the extraction mask of the captured image by application of morphological filtering and of a filling function.

Provision can moreover be made, in step /b/, for the movement of the document to be monitored on the basis of an estimation of movement by optical flow carried out on the captured images.

Such a characteristic makes it possible to obtain a monitoring of movement that is more precise and more robust with regard to possible interferences. In fact, the optical flow makes it possible to confirm or correct the movement monitoring based on the entropy maps. It is thus possible to determine more reliable extraction masks by combining both the processing by entropy and by optical flow in order to determine them.

In an embodiment of the present invention, in step /c/, the end of the movement of the document is detected on the basis of the positions of the respective barycentres of the extraction masks of the successive captured images.

In an embodiment of the present invention, provision can be made, in step /b/, for the movement of the document to be monitored on the basis of the use of a Kalman filter on the captured images.

A second aspect of the present invention proposes a document processing system suitable for the implementation of a document processing method according to the first aspect of the present invention.

Other aspects, aims and advantages of the invention will become apparent on reading the description of one of its embodiments.

BRIEF DESCRIPTION OF THE DRAWINGS

The invention will also be better understood with the help of the drawings, wherein.

DETAILED DESCRIPTION

Figure 1:
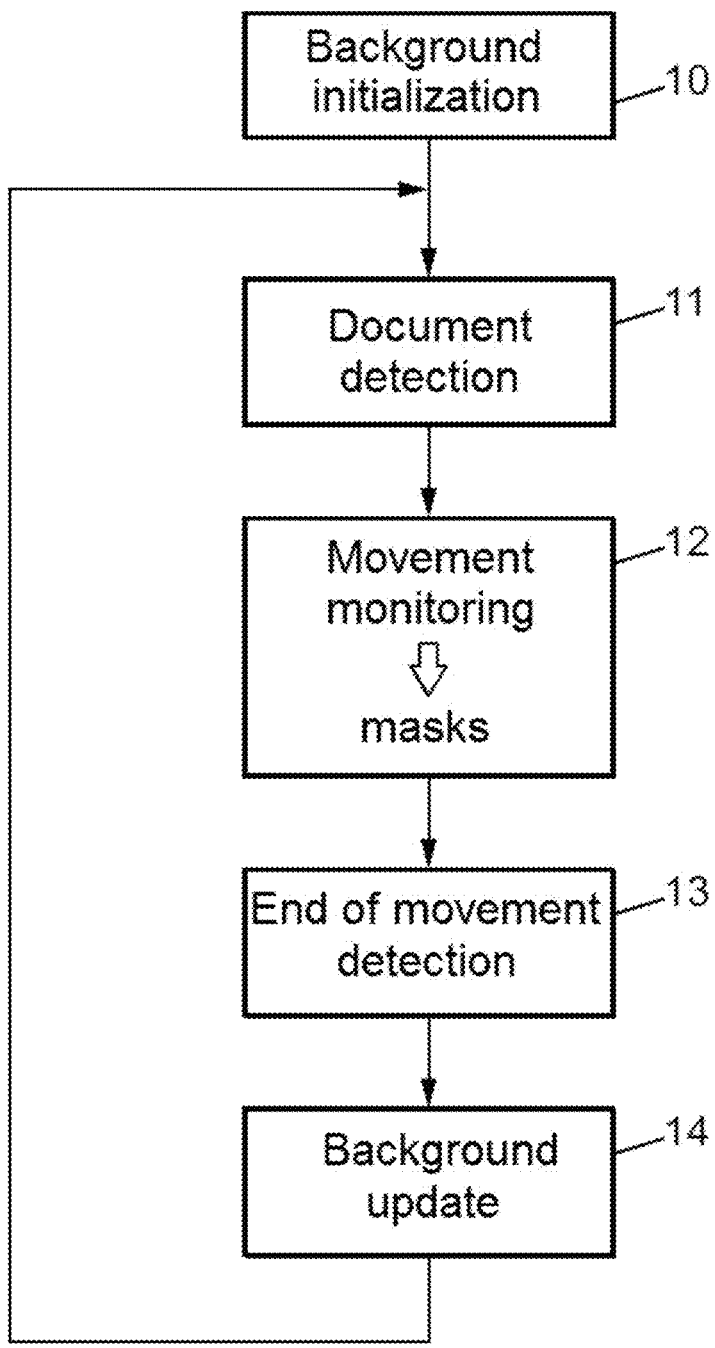
FIG. 1 shows the main steps of a method according to an embodiment of the present invention.

FIG. 1 shows the main steps of a document processing method according to an embodiment of the present invention.

This method is implemented in a system comprising, on the one hand, a device suitable for providing successive captured images and, on the other hand, a background surface. Thus, any document removed from or placed on the background surface can be processed on the basis of the series of captured images according to an embodiment of the present invention.

It is appropriate to store a current background surface image in the system. This current background surface image represents the background surface upon which a document can in particular be placed.

In this example a step of initialisation is provided, consisting of determining an image representing the background surface in a preliminary step 10.

Then, in step 11, the presence of a moving document in a series of captured images with respect to the current background surface image is detected. In this step, provision is made to continuously analyze over time the new presence of a movement in the series of captured images.

In step 12, the movement of the document within the series of captured images is monitored. In an embodiment of the present invention, the movement of a document is monitored by respectively determining extraction masks of the document for the captured images. Each extraction mask of a captured image is obtained on the basis of an entropy map of the captured image with respect to the current background surface image. In an embodiment of the present invention, each entropy map of a captured image is determined on the basis of entropy values associated with the pixels of the captured image in question. More precisely, an entropy value can be determined for each pixel, or group of pixels, of the captured image in question (or at least for a pertinent part of this captured image in the case where the calculations are carried out only in a pertinent search zone of the captured images) on the basis of a difference in grey levels between the current background surface image and the captured image. These entropy values can then be normalized over a range of values between 0 and 255. Thus, by comparison with respect to one or more threshold values, a part of the captured image is selected which corresponds to the document whose movement is detected.

In step 13, the end of the movement of the document is detected.

Then, in step 14, the current background surface image is updated. There is then a return to step 11.

The following sections describe in detail a use of each functionality of the method of processing a document according to an embodiment of the present invention.

Figure 2:
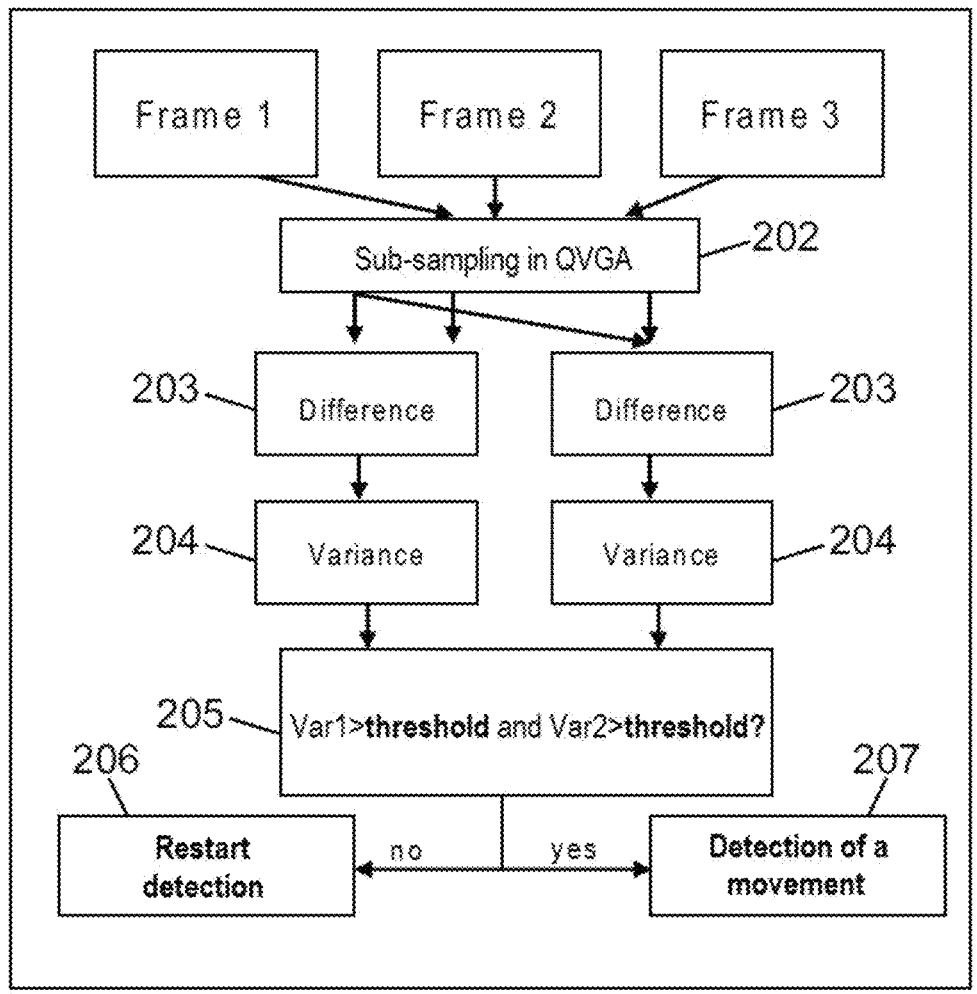
FIG. 2 shows a presence detection functionality according to an embodiment of the present invention.

FIG. 2 shows a document detection functionality 11, or also a functionality of detection of the presence of a document according to an embodiment of the present invention.

In this embodiment, the functionality of detection of presence of a document is based on three captured images which can for example be consecutive: Frame 1, Frame 2 and Frame 3 (or also Image 1, Image 2 and Image 3). In a first phase, provision is made to subsample 202 the captured images in a form of display of the QVGA (Quarter Video Graphics Array, with 320 pixels by 240 pixels) type. Then, images called "difference images" 203 are obtained, which illustrate the differences between the successive captured images in twos. In the case shown here, there is thus obtained a first difference image between image 1 and image 2 and a second difference image between image 2 and image 3. Then, a global variance value is calculated 204 for each of the two difference images. Then, provision can be made that, if the values of these global variances are greater than a fixed threshold value, it is decided that a movement has been detected, 205 and 207. Otherwise, this presence detection function is applied to a following triplet of images, 205 and 206.

The following sections describe a movement monitoring function 12 according to an embodiment of the present invention.

Firstly, in an initial step, provision is made to store an image of the empty background surface, i.e. without any document having been placed on that surface. When the initial background surface is a uniform surface, this step can be carried out on the basis of a detection of uniformity of the captured image. During the movement monitoring, it is then possible to check if the reference background surface is present, in order to update the current background surface image in this case and to stop the movement monitoring.

For this purpose, provision is made to carry out a calculation of uniformity based on a calculation of the mean of standard deviations (that is to say a calculation of the square root of variance) with respect to blocks of the captured image in question. In order to do this, the captured image is divided into blocks of pixels. Then a standard deviation value is determined for each block of pixels. Finally, a mean value of these standard deviations over all of the blocks of the captured image is estimated. A value is then obtained which is here referred to as a uniformity value. This is used to determine if the captured image corresponds to a reference background surface image, this is the blank background surface without a document. More precisely, if this uniformity value is below a certain threshold, it is then decided that the image represents the reference background. This reference background is then stored, for example in the QVGA format according to one of the components of the image, with a view to subsequently reusing it in order to establish entropy maps.

When a document movement is detected, it can result in three different situations:

either a stacking, i.e. the adding of a new document and in this case it is useful to proceed with its extraction in the captured image, or an unstacking, i.e. the removal of one or more documents, or also the removal of all documents and therefore the obtaining of the reference background surface.

In an embodiment, provision is made to monitor movement on the basis of extraction masks which are obtained both by means of entropy calculations and by movement estimations by optical flow.

Figure 3:
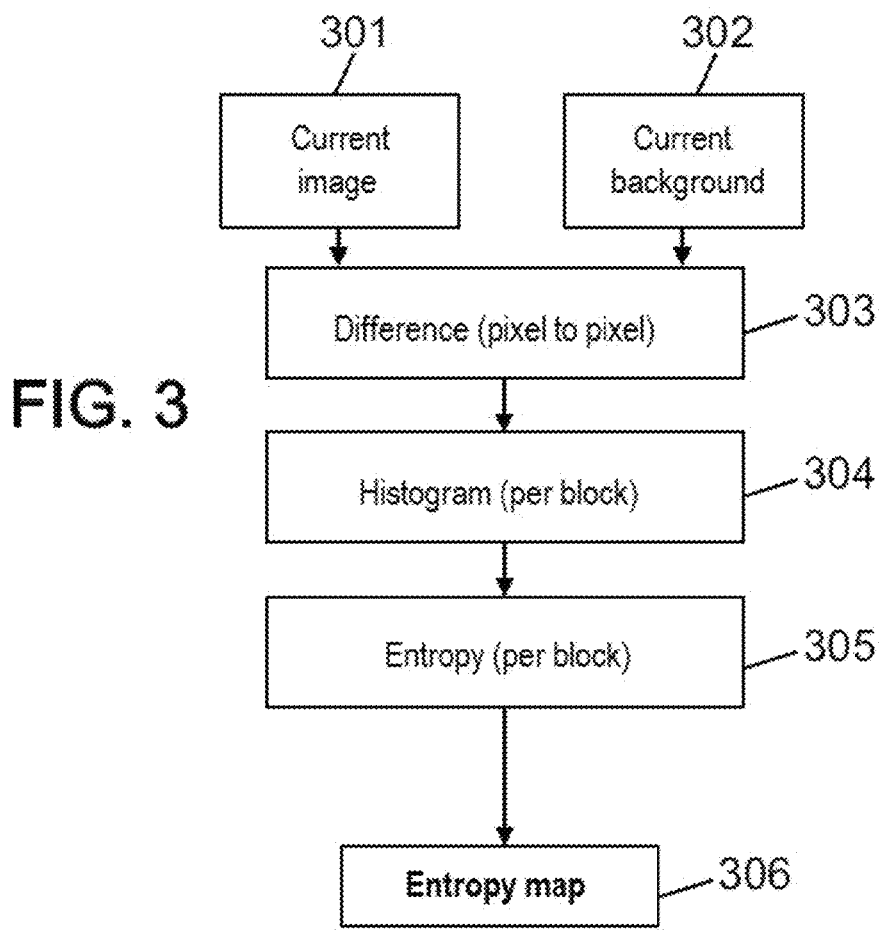
FIG. 3 shows a determination of an entropy map according to an embodiment of the present invention.

FIG. 3 shows the determination of an entropy map according to an embodiment of the present invention.

In order to determine the entropy map of a captured image, provision is made here to calculate an image difference 303 in grey levels, from pixel to pixel, between this captured image 301 (or "current frame") and the current background surface image 302. A histogram of the grey levels for each block of pixels of the captured image is then determined. Then, on the basis of a histogram 304 of the grey levels per bloc of pixels, an entropy value 305 associated with each block of the image is calculated, i.e. each pixel of a single block is associated with the entropy value determined for this block. The entropy map corresponds to these entropy values on the captured image in question.

The following section describes such an entropy calculation according to an embodiment of the present invention. A block size is defined as "BSize" and a scanning step size is defined as "StepSize".

Once the entropy map is calculated in blocks over the whole of the difference image, the values obtained are normalized between 0-255 levels.

More precisely, an entropy map can be obtained as follows:

for each block Bsize×Bsize, an entropy level of the grey levels of pixels is calculated;

this sub-entropy value is then allocated to the central pixels of the sub-block StepSize×StepSize; and finally, the block BSize is shifted by StepSize in order to reiterate the process until the whole captured image in question is scanned.

Figure 4:
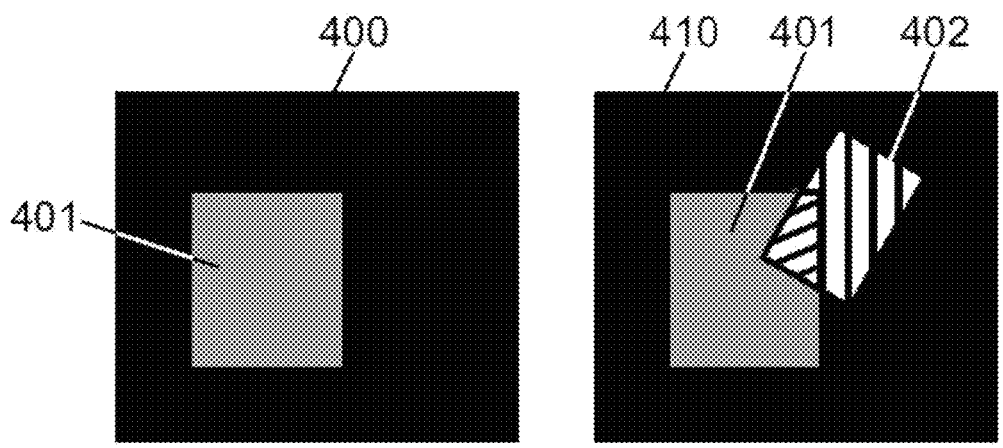
FIG. 4 shows an embodiment of the present invention wherein the extraction mask is determined in two parts.
Figure 5A:
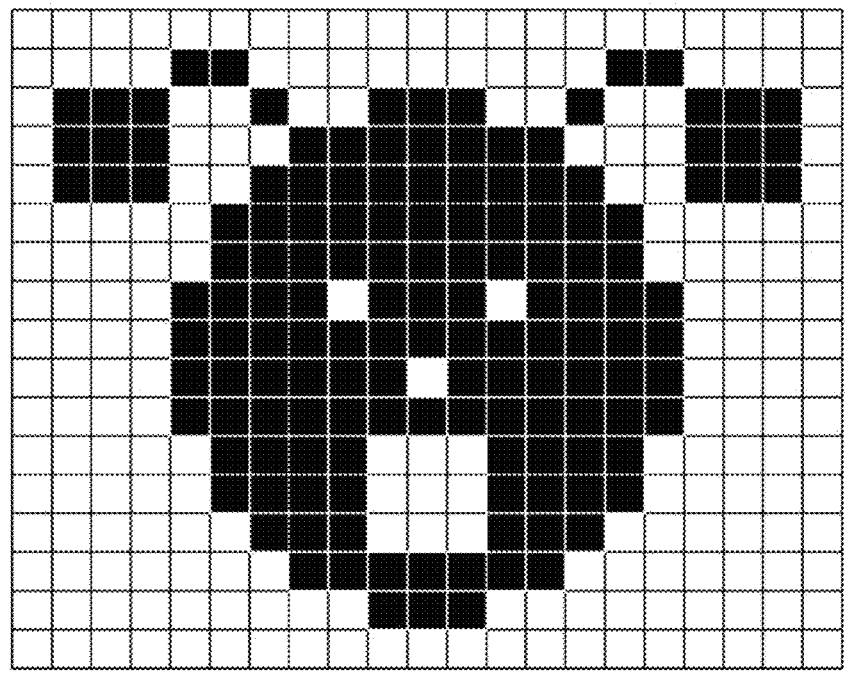
FIGS. 5-A to 5-D illustrate an application of a morphological operator to an extraction mask according to an embodiment of the present invention.
Figure 5B:
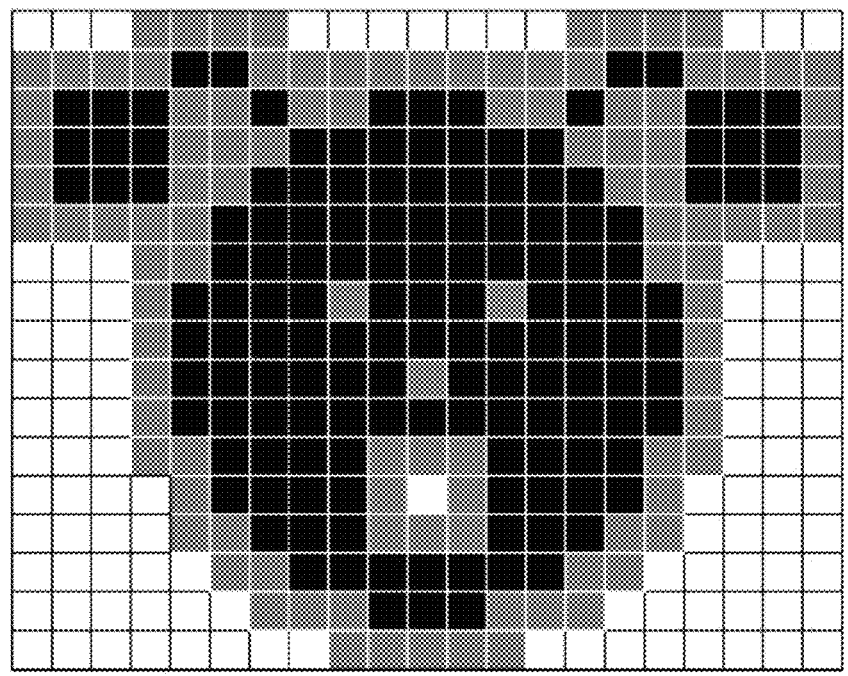
Figure 5C:
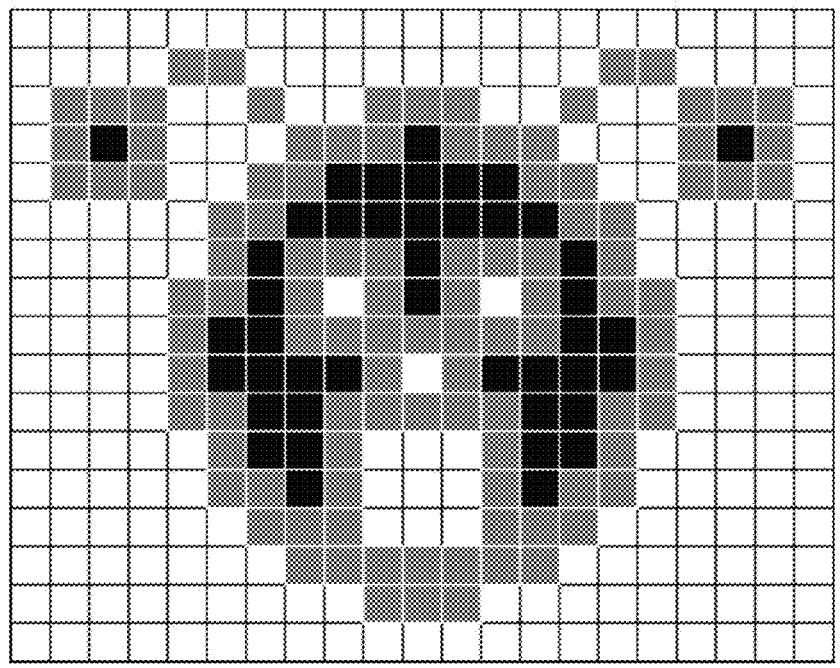
Figure 5D:
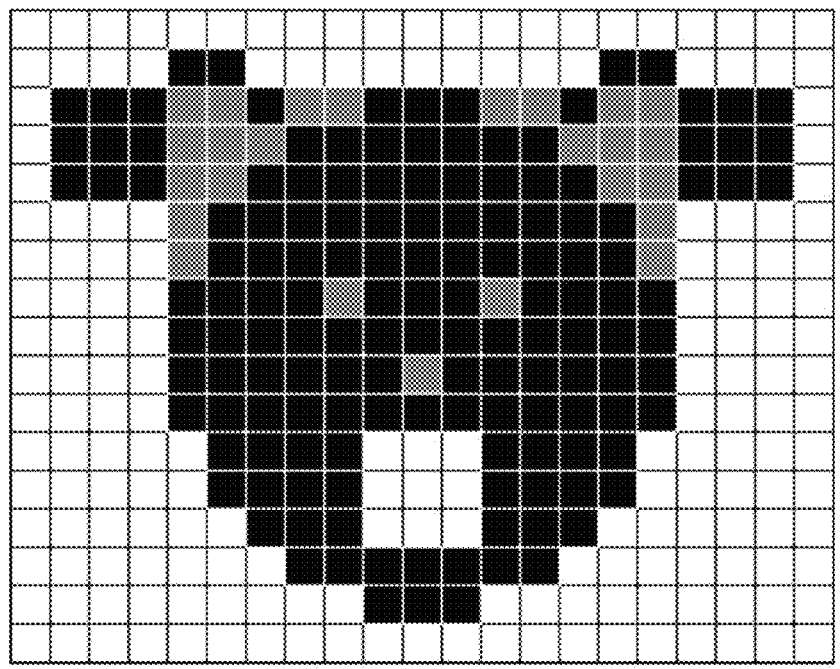

In an embodiment of the present invention, the extraction mask is determined as a function of a first and of a second zone. FIG. 4 shows such an embodiment. Here, the determination of an extraction mask passes through an intermediate step where two separate regions on the entropy map are referenced, that are firstly independently thresholded with respect to two separate threshold values, and which are then united.

FIG. 4 shows a captured image 400 which represents a deposit surface upon which a document 401 is placed. Once the document 401 is placed in a stable manner on the deposit surface, the image 400 is stored as a current background surface image. Then, FIG. 4 also shows a captured image 410 which represents the image of the current background surface 400 on which a new document 402 is being placed. At this stage, the document 402 partially overlaps the document 401. Thus, the new document 402 can be considered according to two regions: a first region which corresponds to the part which is common to the documents 401 and 402 and a second region which corresponds to the remainder of the document 402.

For the first region, a logic AND between the extraction mask previously calculated for the captured image 400 and the extraction mask of the captured image 410 is carried out.

Finally, a first part of entropy map for the first region of the document 402 and a second part of entropy map for the second region of the document 402 are obtained. Two separate threshold values can then be defined in order to establish the extraction mask, the threshold value of the common part being higher than the threshold value associated with the other part in order to prevent possible interferences due to the system and to the presence of the ticket already deposited. In order to obtain the complete extraction mask it then suffices to carry out a logic OR in order to concatenate the two parts of the mask.

In an embodiment, provision is made to then apply morphological operators in order to eliminate non-pertinent parasitic regions which could appear on the extraction mask obtained in this step.

It can thus be advantageous to apply a morphological closure which corresponds to the succession of two elementary operations: a dilation and then an erosion.

A morphological operator is applied which makes it possible to connect regions of the extraction mask which appear as disconnected. This can be the case when there are large uniform zones in the document in question. In this case an entropy value for these uniform zones can be zero or almost zero in these regions.

It is advantageous for the extraction mask to represent the whole of the document in order to be able to extract it from captured images. It can thus be advantageous to apply a morphological opening which corresponds to the succession of two elementary operations: an erosion and then a dilation.

During a dilation, it is a matter of using a structuring element for dilating an image expressed in binary. During an erosion, a structuring element is used for eroding the structure of the binary image. FIGS. 5-A to 5-D illustrate such operations according to an embodiment of the present invention. FIG. 5-A shows the extraction mask before application of a morphological operator. FIG. 5-B shows a dilation operation applied to this extraction mask. This dilation is here based on a structuring element corresponding to a square of dimensions 3×3. FIG. 5-C shows the application of an erosion to the dilated structure obtained such as illustrated in FIG. 5-B. This erosion is also based on a structuring element corresponding to a 3×3 square. Finally, FIG. 5-D shows an extraction mask obtained after a reiteration of successive dilatation and erosion operations according to an embodiment of the present invention.

Figure 6:
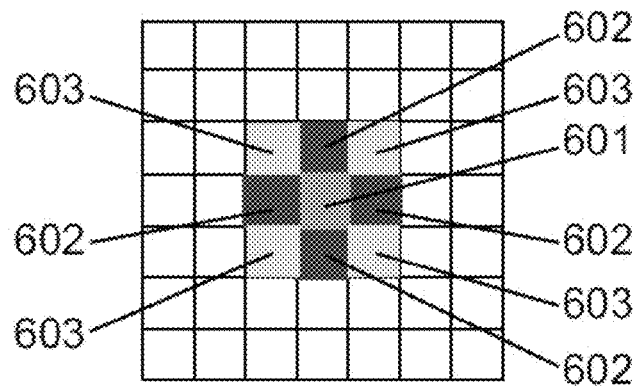
FIG. 6 shows a step of determination of connected components according to an embodiment of the present invention.

Then, a step of determination of connected components makes it possible to sort and filter the regions obtained according to the extraction mask as a function of their size in particular. In fact, such connected components make it possible to determine the regions of the extraction mask which are connected with each other. In an embodiment of the present invention, connected regions are searched for by neighbourhood. More precisely, two pixels are considered neighbours here if they can satisfy a type 4 neighbourhood relationship, such as illustrated in FIG. 6. In FIG. 6, four pixels 602 are neighbours of a pixel 601, the pixels 603 not being neighbours of this pixel 601. On the basis of this neighbourhood rule, the extraction mask is scanned, checking if this relationship is satisfied and it is consequently decided to create or not to create a new region of the extraction mask.

Then, in an embodiment of the present invention, provision is made to apply a filling function which makes it possible to fill the holes remaining in the extraction mask obtained at this stage. For this purpose, ends of each line and each column of the extraction mask in the vertical and horizontal directions are marked. Once these ends have been marked, each line and each column is filled in order to fill any holes in the mask.

It is then possible to provide for taking into account an estimation of movement based on a determination of optical flow, in order to refine the information of the extraction mask so far obtained. Alternatively of course, provision can also be made for using a Kalman filter on the captured images in order to estimate this document movement.

The optical flow makes it possible to determine the displacement of the pixels of an image between two successive images. This taking into account of an optical flow is particularly suitable for the case where the depositing of a new document results in the mobility of certain documents previously placed and included in the current background surface image in question. In order to estimate a document movement by optical flow, it is possible to envisage estimating the movement of certain characteristic points extracted from the moving document. These characteristic points can in particular be corners in the document that can be detected using a Harris detector (or filter).

Figure 7:
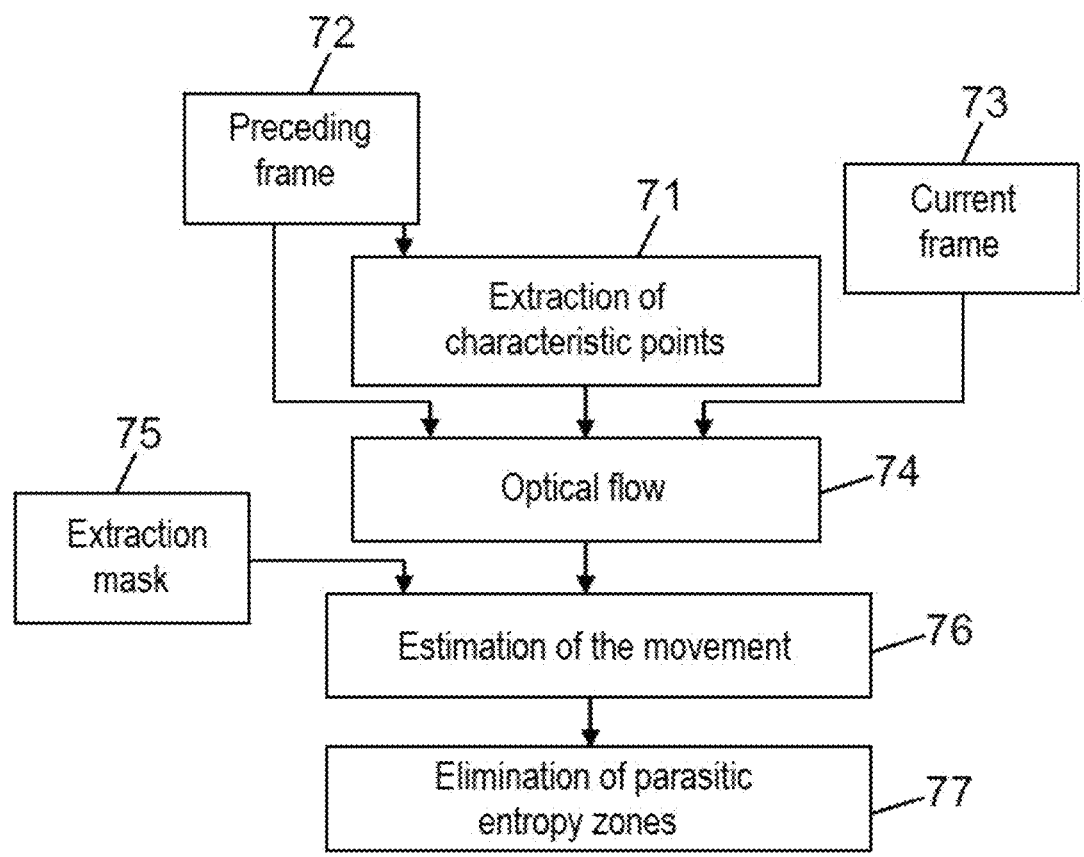
FIG. 7 shows the taking into account of an estimation of movement based on a determination of optical flow according to an embodiment of the present invention.

FIG. 7 shows such a functionality according to an embodiment of the present invention. An extraction of characteristic points 71 can be carried out on the basis of the preceding captured image 72. Then, at these characteristic points, the movement of the document is estimated by optical flow between the preceding captured image 72 and the current image 73. At this stage, it is advantageously possible to take account, on the one hand, of the extraction mask 75 determined as described previously and the movement estimated by optical flow in order to combiner these items of movement information and to reduce possible errors. A combined movement estimation 76 is then obtained which makes it possible to eliminate, in a step 77, parasitic zones of the extraction mask.

It is appropriate to note that, thanks to the optical flow, it is possible to estimate a mean displacement vector of the pixels of the moving document. Thus, the zone of movement of the incoming document can be delimited efficiently, and the zones of parasitic movement around this zone of movement can be eliminated. The parasitic zones of movement can for example be linked with the movement of a background ticket.

Figure 8:
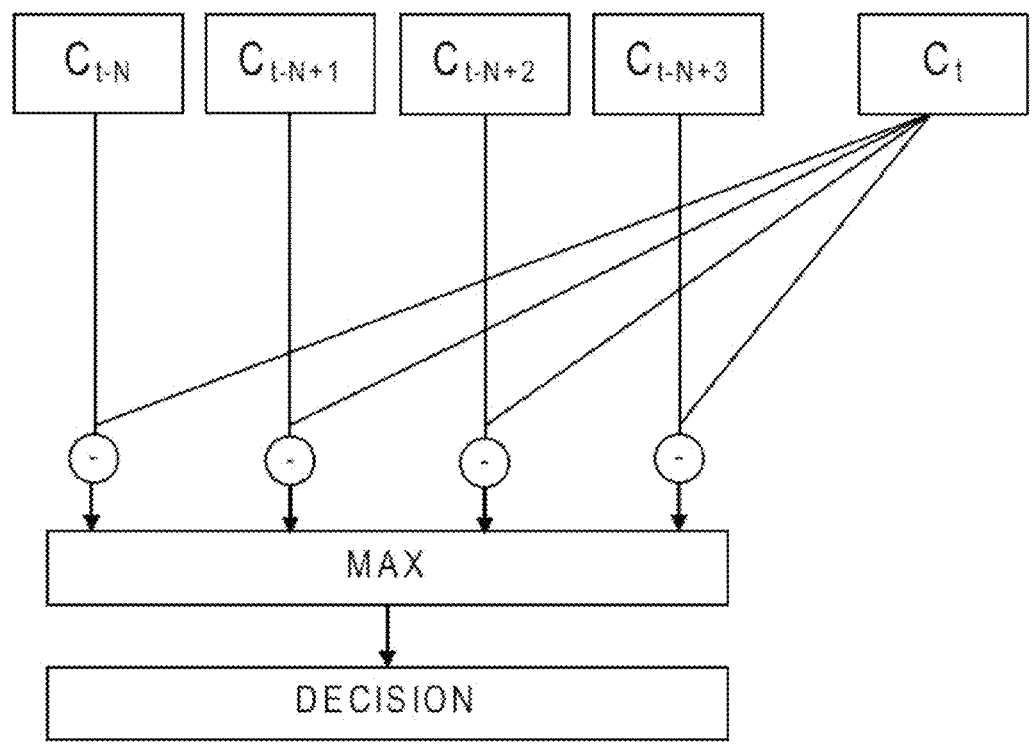
FIG. 8 shows a step of detection of end of movement according to an embodiment of the present invention.

FIG. 8 shows a step of detection of end of movement according to an embodiment of the present invention. In order to decide if the document is stable or not, provision is made here to analyse positions of the barycentres of the extraction masks obtained for the last N captured images. In FIG. 8, Ct N, Ct-N+1, Ct-N+2, Ct-N+3, represent the respective positions of the barycentre of certain previous captured images. Then, for the current captured image I, the differences in barycentre position between the position of the barycentre of the current image and the position of the barycentre of the stored preceding images is calculated.

Then, if the maximum value of these differences is below a given threshold, then it can be decided that the document is stable and that therefore its movement is finished.

Figure 9:
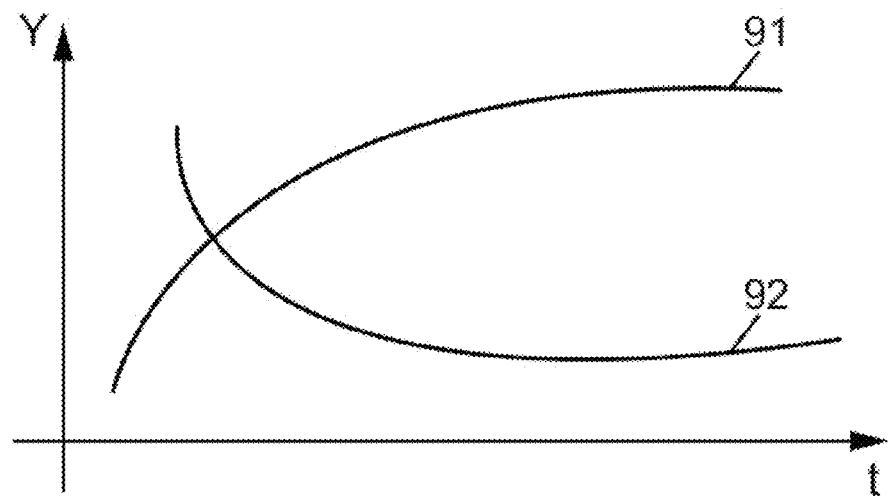
FIG. 9 shows a decision making with regard to document stacking or unstacking according to an embodiment of the present invention.

Once the end of movement of the document has been detected, it is decided if a document stacking or unstacking is in progress. FIG. 9 shows such a decision.

In order to do this, provision is made in an embodiment of the present invention to take as a basis a global trajectory of characteristic points extracted from the document. In particular, the characteristic points which were used for calculating the optical flow can be used. These points can correspond to corners that are extracted from the image in grey level by means of a Harris filter. Stacking or unstacking actions can be differentiated by analyzing the overall trajectory of these characteristic points according to a component. In order to increase the reliability of this functionality, it can be advantageous to provide a segmentation of the "skin", in order to disassociate the zone of movement of the "skin" from the zone of movement of the document. FIG. 9 shows the direction of movement of characteristic points as a function of a vertical axis Y and a horizontal time axis. The Y axis can correspond to the axis along which the document is directed either when it is placed on the background surface or when it is removed from the background surface. The curve 91 can thus correspond to document stacking whilst the curve 92 corresponds to document unstacking.

Figure 10:
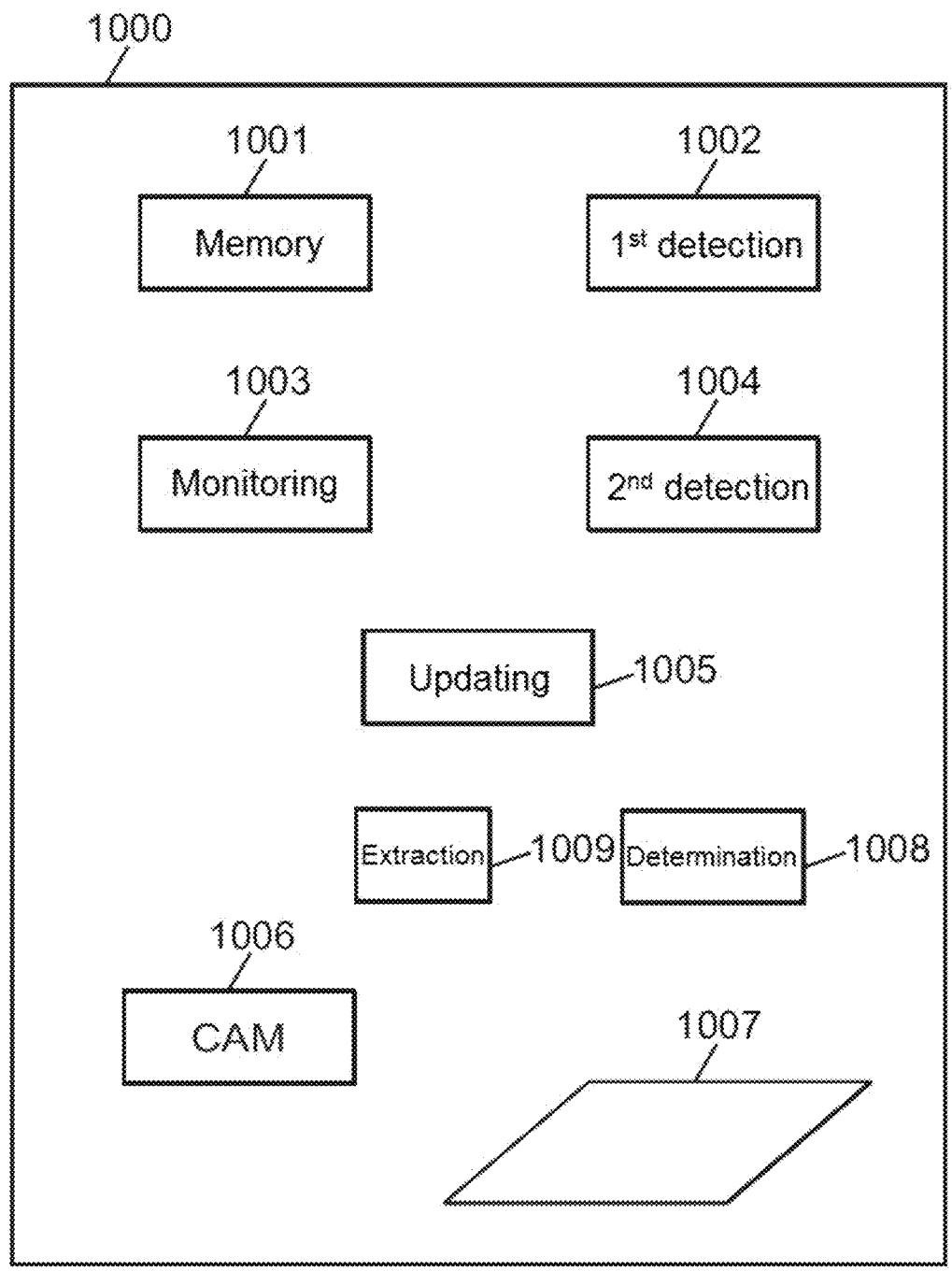
FIG. 10 shows a document processing system according to an embodiment of the present invention.

FIG. 10 shows a document processing system according to an embodiment of the present invention.

A document processing system comprises, on the one hand, a device suitable for providing successive captured images 1006 and, on the other hand, a background surface 1007.

It comprises moreover:

a memory 1001 for storing a current background surface image;

a first detection unit 1002 suitable for detecting the presence of a moving document in a series of captured images with respect to the current background surface image;

a monitoring unit 1003 suitable for monitoring said movement of the document within said series of images;

a second detection unit 1004 suitable for detecting the end of the movement of said document; and an updating unit 1005 suitable for updating the current background surface image; wherein, the monitoring unit is able to monitor the movement of the document by determining extraction masks of the document respectively for the captured images, the extraction mask of a captured image being obtained on the basis of an entropy map of said captured image with respect to said current background surface image.

The system can also comprise a determination unit 1008 suitable for determining a direction of movement of characteristic points of the extraction mask according to an axis over the series of captured images; and an extraction unit 1009 suitable for extracting, if the direction of movement corresponds to a document stacking, an image of the document from a captured image.

The monitoring unit 1003 can determine an extraction mask for a given captured image by:

/i/ obtaining an entropy map on the basis of a difference in grey levels between the current background surface image and the given captured image, said entropy map associating respective entropy values with the pixels of the image;

/ii/ normalizing the entropy values of said entropy map by obtaining entropy values standardized on a scale of 0-255; and /iii/ determining an extraction mask of the document from the captured image.

The extraction mask of the captured image can moreover be refined by application of morphological filtering and of a filling function.

The monitoring unit can moreover be suitable for monitoring the movement on the basis of an estimation of movement by optical flow carried out on the captured images.

The second detection unit can detect the end of the movement of the document on the basis of the positions of the respective barycentres of the extraction masks of the successive captured images.

The monitoring unit 1003 can determine an extraction mask for a given captured image by:

/i/ obtaining an entropy map on the basis of a difference in grey levels between the current background surface image and the given captured image, said entropy map associating respective entropy values with the pixels of the image;

/ii/ normalizing the entropy values of said entropy map by obtaining entropy values standardized on a scale of 0-255; and /iii/ determining an extraction mask of the document from the captured image corresponding to the pixels of the captured image with which are associated the standardized entropy values higher than a threshold value.

The monitoring unit 1003 can moreover be suitable for:

determining a first zone of said captured image corresponding to the zone common to the entropy map of the captured image and to the extraction mask of the preceding captured image;

determining a second zone corresponding to the extraction mask of said captured image outside of the first zone; and wherein a first part of the extraction mask corresponds to the pixels of the captured image of the first zone with which are associated normalized entropy values higher than a first threshold value and a second part of the extraction mask corresponds to the pixels of the captured image of the second zone with which are associated normalized entropy values higher than a second threshold value;

said first threshold value being higher than said second threshold value.

The extraction mask of the captured image can be obtained by application of morphological filtering and of a filling function.

The monitoring unit can moreover be suitable for monitoring the movement on the basis of an estimation of movement by optical flow carried out on the captured images.

The second detection unit 1004 can detect the end of the movement of the document on the basis of the positions of the respective barycentres of the extraction masks of the successive captured images.

The invention claimed is:

1. Document processing method in a system comprising on the one hand, a device suitable for supplying successive captured images and, on the other hand, a background surface; said system storing a current background surface image; said processing method comprising the following steps:

/a/ detecting the presence of a moving document in a series of captured images with respect to the current background surface image;

/b/ monitoring said movement of the document within said series of images;

/c/ detecting the end of the movement of said document; and

/d/ updating the current background surface image;

wherein, in step /b/, the movement of the document is monitored by determining document extraction masks respectively for the captured images, the extraction mask of a captured image being obtained on the basis of an entropy map of said captured image with respect to said current background surface image.

2. Processing method according to claim 1, comprising moreover the following steps:

determining a direction of movement of characteristic points of the extraction mask according to an axis over the series of captured images; and if the direction of movement corresponds to a document stacking, extracting an image of the document from a captured image.

3. Document processing method according to claim 1, wherein an entropy map is obtained for a given captured image in a movement search zone;

said movement search zone being determined on the basis of the extraction mask determined for the preceding captured image.

4. Document processing method according to claim 1, wherein an extraction mask is determined for a given captured image according to the following steps:

/i/ obtaining an entropy map on the basis of a difference in grey levels between the current background surface image and the given captured image, said entropy map associating respective entropy values with the pixels of the image;

/ii/ normalizing the entropy values of said entropy map by obtaining standardized entropy values on a scale of 0-255; and /iii/ determining an extraction mask of the document from the captured image corresponding to the pixels of the captured image with which standardized entropy values higher than a threshold value are associated.

5. Document processing method according to claim 3, comprising moreover the following steps on a given captured image:

determining a first zone of said captured image corresponding to the zone that is common to the entropy map of said captured image and to the extraction mask of the preceding captured image;

determining a second zone corresponding to the extraction mask of said captured image outside of the first zone; and wherein step /iii/ is carried out for the first zone and the second zone of the captured image, a first part of the extraction mask of the captured image corresponding to the pixels of the captured image of the first zone with which standardized entropy values higher than a first threshold value are associated and a second part of the extraction mask of the captured image corresponding to the pixels of the captured image of the second zone with which entropy values higher than a second threshold value are associated;

said first threshold value being higher than said second threshold value.

6. Document processing method according to claim 1, wherein the extraction mask of the captured image is obtained by application of morphological filtering and of a filling function.

7. Document processing method according to claim 1, wherein, in step /b/, the movement of the document is moreover monitored on the basis of an estimation of movement by optical flow carried out on the captured images.

8. Document processing method according to claim 1, wherein, in step /b/, the movement of the document is monitored on the basis of the use of a Kalman filter on the captured images.

9. Document processing method according to claim 1, wherein, in step /c/, the end of the movement of the document is detected on the basis of the positions of the respective barycentres of the extraction masks of the successive captured images.

10. Document processing system comprising, on the one hand, a device suitable for providing successive captured images and, on the other hand, a background surface;

said system comprising:

a memory for storing a current background surface image;

a first detection unit suitable for detecting the presence of a moving document in a series of captured images with respect to the current background surface image;

a monitoring unit suitable for monitoring said movement of the document within said series of images;
a second detection unit suitable for detecting the end of the movement of said document; and
an updating unit suitable for updating the current background surface image;
wherein, the monitoring unit is able to monitor the movement of the document by determining extraction masks of the document respectively for the captured images, the extraction mask of a captured image being obtained on the basis of an entropy map of said captured image with respect to said current background surface image;
the document processing system further comprising:
a determination unit suitable for determining a direction of movement of characteristic points of the extraction mask according to an axis over the series of captured images; and
an extraction unit suitable for extracting, if the direction of movement corresponds to a document stacking, an image of the document from a captured image.

11. Document processing system according to claim 10, wherein the monitoring unit is moreover suitable for:
determining a first zone of said captured image corresponding to the zone common to the entropy map of the captured image and to the extraction mask of the preceding captured image;
determining a second zone corresponding to the extraction mask of said captured image outside of the first zone; and
wherein a first part of the extraction mask corresponding to the pixels of the captured image of the first zone with which are associated the normalized entropy values higher than a first threshold value and a second part of the extraction mask corresponding to the pixels of the captured image of the second zone with which are associated normalized entropy values higher than a second threshold value;
said first threshold value being higher than said second threshold value.

12. Document processing system according to claim 10, wherein the extraction mask of the captured image is obtained by application of morphological filtering and of a filling function.

13. Document processing system according to claim 10, wherein the monitoring unit is moreover suitable for monitoring the movement on the basis of an estimation of movement by optical flow carried out on the captured images.

14. Document processing system according to claim 10, wherein the second detection unit detects the end of the movement of the document on the basis of the positions of the respective barycentres of the extraction masks of the successive captured images.

15. Document processing system comprising, on the one hand, a device suitable for providing successive captured images and, on the other hand, a background surface, said system comprising:
a memory for storing a current background surface image;
a first detection unit suitable for detecting the presence of a moving document in a series of captured images with respect to the current background surface image;
a monitoring unit suitable for monitoring said movement of the document within said series of images;
a second detection unit suitable for detecting the end of the movement of said document; and
an updating unit suitable for updating the current background surface image;
wherein, the monitoring unit is able to monitor the movement of the document by determining extraction masks of the document respectively for the captured images, the extraction mask of a captured image being obtained on the basis of an entropy map of said captured image with respect to said current background surface image,
wherein the monitoring unit determines an extraction mask for a given captured image by:
/i/ obtaining an entropy map on the basis of a difference in grey levels between the current background surface image and the given captured image, said entropy map associating respective entropy values with the pixels of the image;
/ii/ normalizing the entropy values of said entropy map by obtaining entropy values standardized on a scale of 0-255; and
/iii/ determining an extraction mask of the document from the captured image corresponding to the pixels of the captured image with which are associated the standardized entropy values higher than a threshold value.

16. Document processing system according to claim 15, wherein the monitoring unit is moreover suitable for:
determining a first zone of said captured image corresponding to the zone common to the entropy map of the captured image and to the extraction mask of the preceding captured image;
determining a second zone corresponding to the extraction mask of said captured image outside of the first zone; and
wherein a first part of the extraction mask corresponding to the pixels of the captured image of the first zone with which are associated the normalized entropy values higher than a first threshold value and a second part of the extraction mask corresponding to the pixels of the captured image of the second zone with which are associated normalized entropy values higher than a second threshold value;
said first threshold value being higher than said second threshold value.

17. Document processing system according to claim 15, wherein the extraction mask of the captured image is obtained by application of morphological filtering and of a filling function.

18. Document processing system according to claim 15, wherein the monitoring unit is moreover suitable for monitoring the movement on the basis of an estimation of movement by optical flow carried out on the captured images.

19. Document processing system according to claim 15, wherein the second detection unit detects the end of the movement of the document on the basis of the positions of the respective barycentres of the extraction masks of the successive captured images.

* * * * *